United States Patent
Davlantes et al.

(10) Patent No.: US 10,090,707 B2
(45) Date of Patent: Oct. 2, 2018

(54) WIRELESS POWER TRANSMISSION

(71) Applicant: Supply, Inc., Menlo Park, CA (US)

(72) Inventors: Christopher Joseph Davlantes, Menlo Park, CA (US); Brandon Huu Tho Le, Menlo Park, CA (US)

(73) Assignee: Supply, Inc., Oakland, CA (US)

( * ) Notice: Subject to any disclaimer, the term of this patent is extended or adjusted under 35 U.S.C. 154(b) by 281 days.

(21) Appl. No.: 14/865,489

(22) Filed: Sep. 25, 2015

(65) Prior Publication Data

US 2016/0094092 A1   Mar. 31, 2016

Related U.S. Application Data

(60) Provisional application No. 62/055,283, filed on Sep. 25, 2014.

(51) Int. Cl.
| | |
|---|---|
| *H02J 50/23* | (2016.01) |
| *H02J 17/00* | (2006.01) |
| *H02J 50/20* | (2016.01) |
| *H01Q 3/36* | (2006.01) |
| *H01Q 9/04* | (2006.01) |
| *H02J 5/00* | (2016.01) |
| *H01Q 21/06* | (2006.01) |
| *H04B 5/00* | (2006.01) |

(52) U.S. Cl.
CPC ............. *H02J 17/00* (2013.01); *H01Q 3/36* (2013.01); *H01Q 9/0407* (2013.01); *H01Q 21/065* (2013.01); *H02J 5/005* (2013.01); *H02J 50/20* (2016.02); *H02J 50/23* (2016.02); *H04B 5/0037* (2013.01)

(58) Field of Classification Search
CPC .................................. H02J 50/20; H02J 50/23
See application file for complete search history.

(56) References Cited

U.S. PATENT DOCUMENTS

| | | | |
|---|---|---|---|
| 6,967,462 B1 | 11/2005 | Landis | |
| 9,882,427 B2 * | 1/2018 | Leabman | H02J 50/20 |
| 2004/0203846 A1 | 10/2004 | Caronni | |
| 2007/0243851 A1 | 10/2007 | Shoarinejad | |
| 2009/0284082 A1 | 11/2009 | Moshfeghi | |
| 2010/0033021 A1 | 2/2010 | Bennett | |
| 2011/0156640 A1 | 6/2011 | Moshfeghi | |
| 2011/0281535 A1 * | 11/2011 | Low | H02J 7/025 455/129 |

OTHER PUBLICATIONS

Brown, William C. "The history of power transmission by radio waves." IEEE Transactions on microwave theory and techniques 32, No. 9 (1984): 1230-1242.*

* cited by examiner

*Primary Examiner* — Daniel Cavallari
(74) *Attorney, Agent, or Firm* — Jeffrey Schox; Diana Lin

(57) ABSTRACT

A radio-frequency power transmitter. The radio-frequency power transmitter includes an array of patch antennas, an array of phase modulators, each phase modulator having an input port and associated with one or more of the patch antennas, a local oscillator that provides an oscillatory signal to the input port of each of the phase modulators, an array of amplifiers, each amplifier receiving an input from one of the phase modulators, and a microprocessor configured to interface with the array of phase modulators and control a holistic radiative power transmission vector pattern generated by the radio-frequency power transmitter.

15 Claims, 9 Drawing Sheets

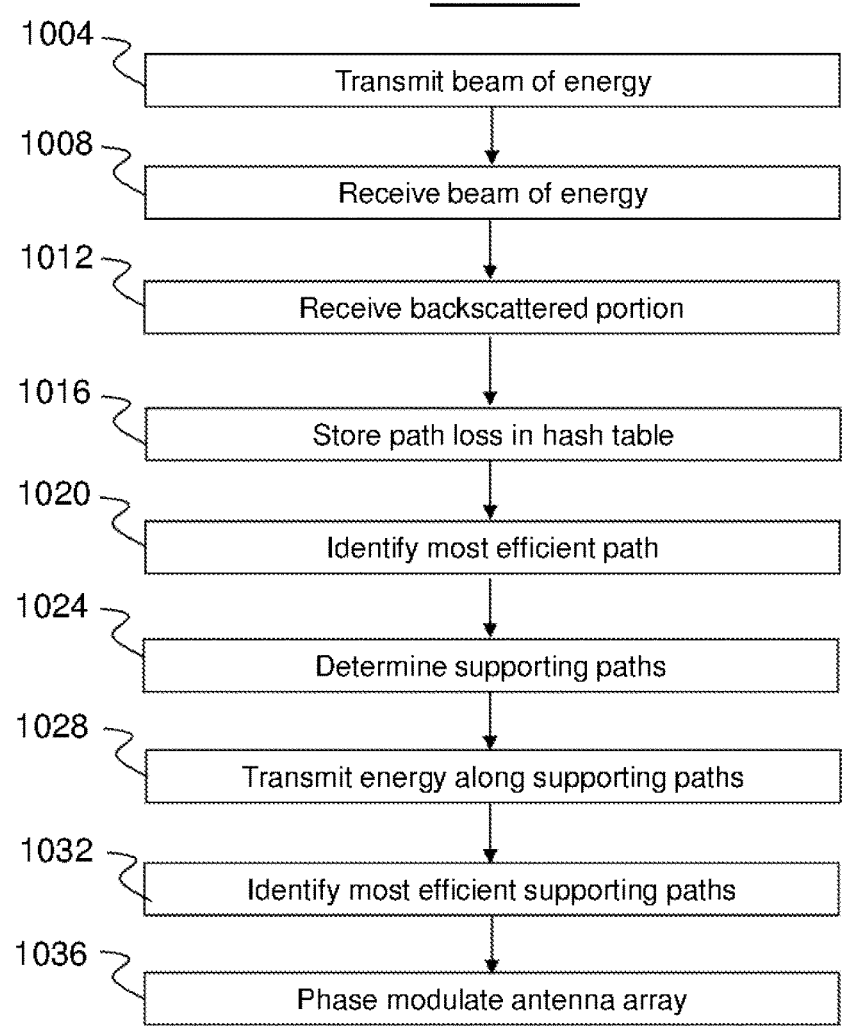

WIRELESS POWER TRANSMISSION

CROSS-REFERENCE TO RELATED APPLICATIONS

This application claims priority to and the benefit of, and incorporates by reference herein in its entirety, U.S. Provisional Patent Application No. 62/055,283, filed Sep. 25, 2014.

BACKGROUND OF THE TECHNOLOGY

A problem in the electronics industry is that of access to power. Almost all modern devices require power that originates from a wall outlet. Therefore, wireless electricity has been sought after as an attractive solution that would allow users to access energy without the use of electrical cords and outlets. Moreover, the promise of spatial freedom, mobility, and motion also urge the use of wireless power. Unfortunately, current commercial wireless chargers come in the form of wireless mats, which require the target device to be placed on top, or within a few centimeters, of the mat. These induction-based solutions are scientifically inefficient at transmitting power at long distances on the order of meters. Therefore far-field solutions must be implemented for long-range wireless power.

Far-field transmission's primary problem—which is the source of one of its advantages—is the directionality of the electromagnetic (EM) waves. Because these waves experience beamforming, the EM waves act as spotlights, only transmitting in one direction. The antenna's gain would be correlated with the beamwidth is (i.e. narrow vs broad vs isotropic). This directionality poses the problem of mobility and motion; because the waves only face one direction, a user who steps out of the field or is positioned elsewhere in the space will not receive power.

SUMMARY OF THE TECHNOLOGY

One way to solve this problem is with a system that can sense and track a user-device's local location within the range of the transmitter, calculate the EM paths that are best suited to send power efficiently, and transmit power to the user's device.

The system can include an array of antennas that are optimally oriented for antenna switching. That is, each antenna that is part of the array is be responsible for powering a particular extrusion of the field's volume. These antennas can then be individually controlled to either transmit or not transmit based on the location of user-devices in range. The optimal paths—and therefore optimal antennas to switch on—for transmission depend on the paths possible from the transmitter to the user-device. A direct line-of-sight can be used. For example, if a user-device is detected to be 45 deg from the transmitter's normal, the only antennas part of the array that will transmit power are the ones at the 45 deg. However, with multi-path propagation, paths that utilize reflections off of walls, obstacles, and other reflective or refractive material may also be determined as optimal for power transmission independent of the existence of a line-of-sight route. The system can constantly detect and update the position of the user-device in order to allow the user-device to move while still receiving wireless power from the transmitter.

In one aspect, the invention features a radio-frequency power transmitter. The radio-frequency power transmitter includes an array of patch antennas. The radio-frequency power transmitter also includes an array of phase modulators, each phase modulator having an input port and associated with one or more of the patch antennas. The radio-frequency power transmitter also includes a local oscillator that provides an oscillatory signal to the input port of each of the phase modulators. The radio-frequency power transmitter also includes an array of amplifiers, each amplifier receiving an input from one of the phase modulators. The radio-frequency power transmitter also includes a microprocessor configured to interface with the array of phase modulators and control a holistic radiative power transmission vector pattern generated by the radio-frequency power transmitter.

In some embodiments, the array of patch antennas is a square array and the patch antennas are resonant at 5.6 GHz. In some embodiments, portions of the array of patch antennas are controlled together as a subarray. In some embodiments, the oscillatory signals at the inputs to the phase modulators are in phase.

In another aspect, the invention features a radio-frequency power receiver. The radio-frequency power receiver includes an array of passively phased, resonant antennas. The radio-frequency power receiver also includes an array of resonant high frequency rectifiers configured to receive energy from the array of antennas. The radio-frequency power receiver also includes local and global maximum power point tracking circuitry that is configured to dynamically match a load impedance. The radio-frequency power receiver also includes a backscattering antenna configured to aid in receiver localization and receiver incident electric field phase measurements. The radio-frequency power receiver also includes a DC-DC converter configured to deliver a fixed voltage determined by a load device.

In some embodiments, the resonant antennas include at least one of a monopole chip antenna, a dipole chip antenna, a printed dipole antenna, and a patch antenna. In some embodiments, the antennas operate in the 5 GHz-band. In some embodiments, at least a first portion of the antennas are oriented in a horizontal plane and at least a second portion of the antennas are oriented in a vertical plane.

In yet another aspect, the invention features a method of wirelessly delivering power via a phased antenna array. The method includes transmitting with a transmission system, a narrow beam of radio-frequency energy having a solid angle, an elevation angle, and an azimuthal angle. The method also includes receiving the narrow beam of radio-frequency energy with a power receiver and if the received radio-frequency energy is above a predetermined threshold, backscattering a portion of the received radio-frequency energy back towards the phased antenna array. The method also includes receiving the backscattered portion and determining a path loss and a phase shift associated therewith. The method also includes associating the determined path loss and phase shift with the elevation angle and azimuthal angle and storing the association in a hash table. The method also includes identifying a most efficient transmission path based on the associations stored in the hash table. The method also includes determining a set of supporting paths that constructively interfere with the most efficient path such that the supporting paths are within 10 degrees of the most efficient path and have less than 4 dB of loss relative to the most efficient path. The method also includes directing energy along the most efficient transmission path and stochastically transmitting energy along the set of supporting paths and recording the transmission efficiencies thereof. The method also includes identifying the most efficient set of supporting paths. The method also includes phase modulating the phased antenna array to transmit energy along the most efficient transmission path and the most efficient set of supporting paths.

In some embodiments, each antenna in the transmitting system is offset in phase from neighboring antennas. In some embodiments, the beam is transmitted along a path involving at least one reflection.

In yet another aspect, the invention features a method for delivering wireless power from a wireless power transmission system to a mobile device, the wireless power transmission system including an antenna array. The method includes receiving a request for wireless power from the mobile device. The method also includes verifying that the mobile device is authorized to receive power from the wireless power transmission system. The method also includes tracking the mobile device to determine a position of the mobile device. The method also includes selecting at least one antenna from the antenna array, the selection being based on the determined position of the mobile device. The method also includes scanning, by varying the spatial position of a low power microwave beam, to determine a configuration of the wireless power transmission system such that wireless power is delivered from the wireless power transmission system to the mobile device with a maximal efficiency, the low power microwave beam being delivered from the at least one antenna and having a first frequency and a first power in the region of the mobile device. The method also includes configuring the wireless power transmission system to deliver power to the mobile device with maximal efficiency, the configuration being based on the results obtained from scanning with the low power microwave beam. The method also includes delivering power wirelessly from the wireless power transmission system to the mobile device.

In yet another aspect, the invention features a method for dynamically adjusting the price of wireless power. The method includes requesting wireless power for a mobile device. The method also includes receiving of the request by a cloud server associated with a transmitter in geographic proximity to the mobile device. The method also includes adjusting the price of wireless power based on information received from the mobile device and the number of devices requesting wireless power. The method also includes transmitting the adjusted price to the mobile device. The method also includes transmitting wireless power to the mobile device upon confirmation of the adjusted price by a user of the mobile device.

In some embodiments, the information received from the mobile device includes device battery level, device battery consumption rate, user power preferences, user price preferences, or device distance from a wireless power transmitter.

As used herein, the terms "approximately," "roughly," and "substantially" mean ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed invention.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 10 shows a method of operation of a wireless power transmission system according to an illustrative embodiment of the technology.

DETAILED DESCRIPTION

Figure 1:
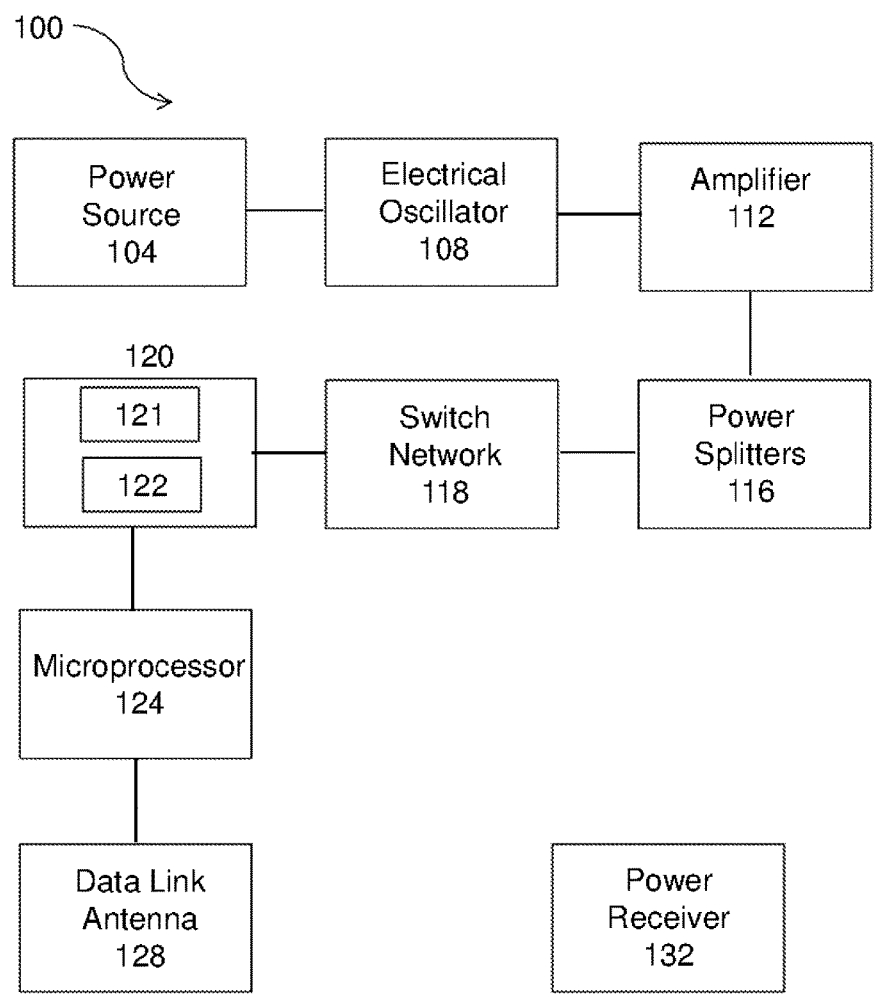
FIG. 1 is a diagram of a wireless power transmission system according to an illustrative embodiment of the technology.

FIG. 1 shows a wireless power transmission system 100. The wireless power transmission system includes a power source 104, an electrical oscillator 108, an amplifier 112, power splitters 116, a switch network 118, an antenna array 120, a microprocessor 124, and a data link antenna 128. The antenna array 120 includes power antennas 121 and handshaking antennas 122. The steerable high gain array 108 is in electrical communication with the electric oscillator 104 and the microprocessor 112. The electrical oscillator 108 is in electrical communication with the power source 104 and the amplifier 112. The amplifier 112 is in electrical communication with the antenna array 120. In some embodiments, power splitters 116 and switch network 118 distribute the electrical signals from the amplifier 112 to the antenna array 120. The microprocessor 124 is in electrical communication with the antenna array 120 and the data link antenna 128. The data link antenna 128 is in wireless electrical communication with a power receiver. During operation, the electrical oscillator 104 receives electrical power from the power source 104 and delivers RF signals to the amplifier 112. The amplifier 112 amplifies the received signals from the electrical oscillator 104 and delivers the amplified RF signals to the power antennas 121. The power splitters 116 can split the power received from the amplifier 112 and deliver RF power separately to each of the power antennas 121. The switch network 118 can control which power antennas 121 receive RF power from the amplifier 112. The power antennas 121 can have a gain of at most 10 dBi at the frequency of the electrical oscillator 108. The microprocessor 124 receives handshaking signals from a device via the handshaking antennas 122. The microprocessor 124 is configured to determine the location of the device requesting power via power sensing by the handshaking antennas 122. Based on the determined location, the microprocessor 124 can configure the power antennas 121 to deliver power to the device. The microprocessor 124 can be configured to provide encryption/decryption and authentication via the internet during the handshaking process. The microprocessor 124 can be further configured to calculate the optimal path from the wireless power transmission system 100 to the device requesting power. In some embodiments, microprocessor 124 can be configured to sort a database containing phase, amplitude, and/or pulse-width modulation information stored for each power antenna 121 to determine the path with the highest received signal strength, which correlates to the most optimal path for power transmission, and transmit in the direction of the most optimal path(s).

In some embodiments, the power source 104 includes a low frequency rectification system for converting low frequency AC to DC. In some embodiments, the electrical oscillator delivers RF signals having a frequency of 2.4 GHz or 5.8 GHz to the power antennas 121. In some embodiments, the amplifier delivers 1 W of RF power to the power antennas 121. In some embodiments, the amplifier delivers greater than 1 W of RF power to the power antennas 121. In some embodiments, the amplifier 112 includes a plurality of amplifiers and each amplifier supplies a single power antenna 121 with amplified RF signals. In some embodiments the power antennas 121 can point radially outward from each other (e.g., panels on a surface of a dome, all normal to the dome surface and pointing away from the transmitter.) In some embodiments, power antennas 121 are patch antennas. In some embodiments, the handshaking antennas 122 operate at a frequency of 900 MHz or 2.4 GHz to reduce potential interference with the power antennas 121. In some embodiments, the handshaking antennas 122 can be placed in proximity to the power antennas 121 to allow the microprocessor 124 to determine which power transmitter to activate based on the received handshake signal. In some embodiments, RF power is transmitted from the wireless power transmission system 100 to a device via a multipath. In some embodiments, the wireless power transmission system 100 includes a phase shifter and modulator configured to modulate and phase shift the RF signals exiting the power splitters 116. In some embodiments, a collection of amplifiers is configured to amplify the RF signals exiting the power splitters 116, with each power antenna 121 having a dedicated amplifier. In some embodiments, the power antennas 121 can be omnidirectional or dipole antennas in either integrated or discrete chip form or discrete, rubber-ducky form connected to each RF amplifier. In some embodiments, the power antennas 121 can be tuned to resonate at a predetermined transmission frequency, providing a resonant architecture. In some embodiments, the amplifiers 112 can be a switch-mode amplifiers of novel design or linear-mode stock amplifiers. In some embodiments, the amplifiers 112 can be linear-mode amplifiers of novel design or switch-mode stock amplifiers. Switch-mode amplifiers can enable, high efficiency designs. In some embodiments, antenna array 120 can be constructed and positioned to allow for controlled interference between radiating elements, yielding a very large array gain. In some embodiments, the data link antenna 128 is a low energy radio transmission element for facilitating information transfer between the power transmission system 100 and the power receiver. In some embodiments, the data link antenna 128 operates at a frequency different from the power antennas to mitigate interference. In some embodiments, the power receiver includes a receive antenna, power reception circuitry, and a microprocessor to facilitate communications to and from the power receiver.

Figure 2:
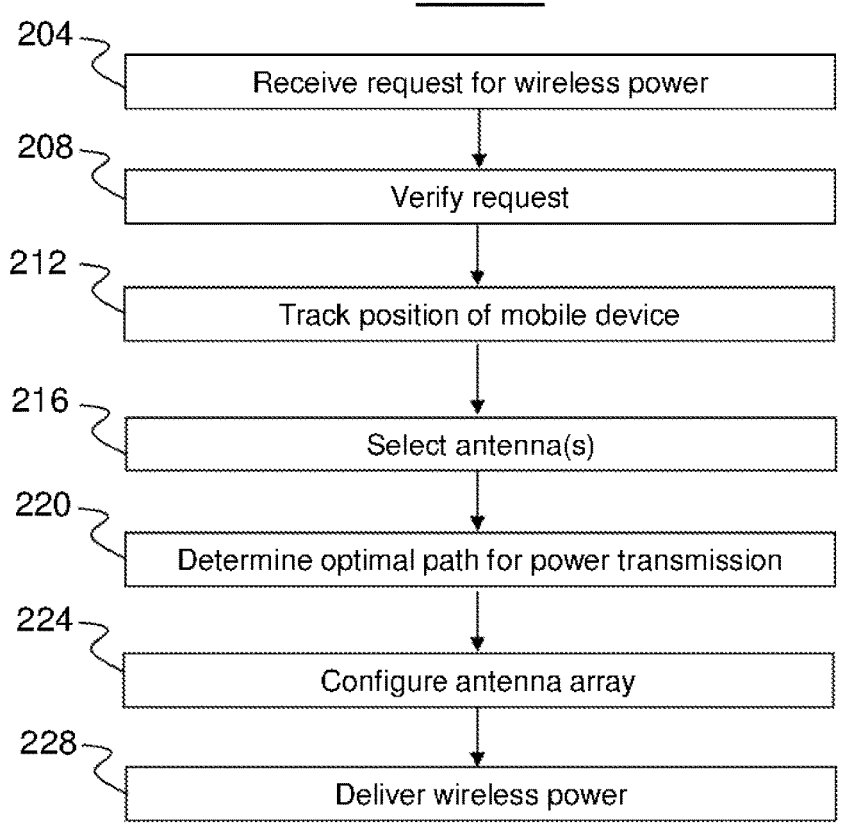
FIG. 2 shows a method of operation of a wireless power transmission system according to an illustrative embodiment of the technology.

FIG. 2 shows a method of operation of a wireless power transmission system 100 as described in FIG. 1. The wireless power transmission system 100 receives a request for wireless power from a power receiver via the data link antenna 128 (step 204). The wireless power transmission system 100 can detect signals received by each of the handshake antennas 122 and parse the strongest signal detected to determine the optimal power antenna for power transmission. The microprocessor 124 can verify that the requesting power receiver is authorized to receive wireless power from the wireless power transmission system 100 (step 208). Subsequent to successful authentication, the wireless power transmission system 100 can track the location of the power receiver (step 212). In some embodiments, the tracking is done via a time-of-flight and/or angle-of-arrival and can determine the position of the power receiver as well as multi-paths that can be used to reach the power receiver. In some embodiments, the wireless power transmission system sweeps an area with a pulse of power and can use a feedback loop to locate the cardinal direction of the power receiver (cross-referencing the detected power receiver-pulses). Based on the location of the power receiver, one or more power antennas 121 can be selected by the microprocessor 124 (step 216). The orientation and or phase of the selected power antennas 121 can be varied to determine an optimal path where power is delivered with maximal efficiency (step 220). The microprocessor then configures the power antennas 121 to deliver power along the optimally determined path (step 224). The power antennas 121 then deliver wireless power to the power receiver (step 228). The power receiver can accept the delivered wireless power through a receiving antenna and can convert the received RF power into DC power via a rectifier circuitry. The power receiver can include a buck-boost converter to convert the DC power into a specified, constant DC power. The power receiver can store the DC power from the buck-boost converter in a rechargeable battery. The power receiver can stop sending omnidirectional periodic pulses to the wireless power transmission system upon the rechargeable battery achieving a complete battery charge. The power receiver can deliver the charge stored in the rechargeable battery to a user device, such as a mobile device.

In some embodiments, the microprocessor 124 determines the optimal ray path or optimal set of ray paths for wireless power transmission based on communicated data from the power receiver. In some embodiments, the power receiver includes communications circuitry that can send a request for power to the wireless power transmission system 100. The communications circuitry can halt transmission of power (e.g., if the power receiver is fully charged.) The communications circuitry can facilitate an authentication process with the wireless power transmission system 100.

In some embodiments, the wireless power transmission system 100 can be in either an active state or in hibernation. The active state can be defined as fully on and either currently transmitting power, in the process of handshaking with a power receiver, or in the process of scanning the area for power receivers. The hibernation state can be defined as a low-power state in which the wireless power transmission system 100 does not currently transmit power, but can be woken up to an active state via a ping by a power receiver or by an interface on the wireless power transmission system 100 by a user of the power receiver. A user of the power receiver can initiate a pulse by pressing a button on the power receiver. In some embodiments, the power receiver can automatically ping the wireless power transmission system 100 upon entering a power hotspot and automatically connect, without the need for user input. The power receiver can send out a pulse of power omnidirectionally and the omnidirectional pulse can travel many different paths, some of them reaching the wireless power transmission system 100. The wireless power transmission system can wake up from hibernation upon receiving a pulse of power from the power receiver and begin scanning the area for the receiver (simultaneously while continuing to receive the pulses from the receiver). The wireless power transmission system 100 can establish a communications link and authenticate the power receiver via, for example, an internal registry or online (e.g., cloud) registry.

In some embodiments, the power receiver sends pulsed omnidirectional signals at periodic intervals to assist the wireless power transmission system 100 in determining a position of the power receiver and to maintain a steady link between the wireless power transmission system 100 and the power receiver.

Figure 3:
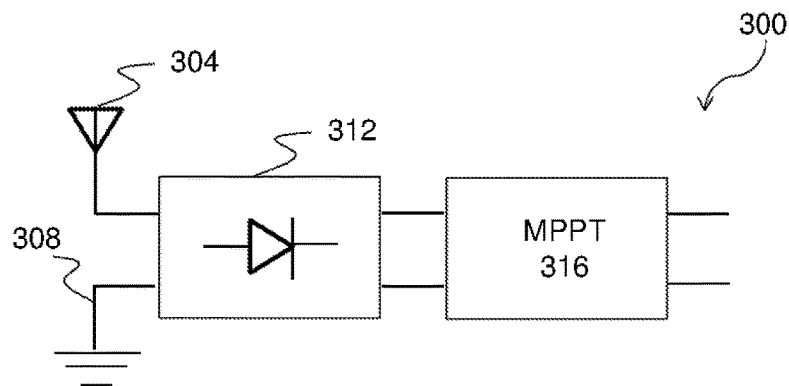
FIG. 3 shows a rectenna according to an illustrative embodiment of the technology.

FIG. 3 shows a rectenna 300. The rectenna includes an antenna 304, a rectifier 312, and local maximum power point tracking circuitry 316. The rectifier 312 is in electrical communication with the antenna 304 and is electrically connected to electrical ground 304. The local maximum power point tracking (MPPT) circuitry 316 is electrically connected to the output of the rectifier 312. During operation, AC electrical signals are received by the antenna 312 and converted to DC by the resonant rectifier 312. The local MPPT circuitry 316 is configured to locally maximize the throughput power efficiency of the rectenna 300 by dynamically adjusting the perceived rectifier load impedance, and, thus, the circuit's operating point. The MPPT circuit can be a switching power converter that is capable of modulating its input impedance by altering its switching duty cycle. The MPPT circuitry can monitor its input power via a sense resistor, and can adjust its duty cycle in order to maximize this input power.

Figure 4:
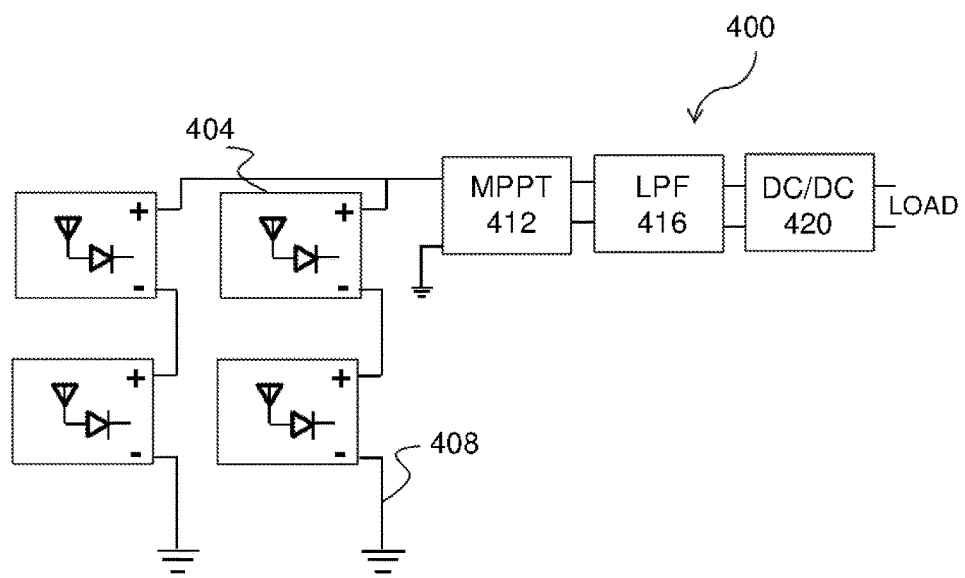
FIG. 4 shows a rectenna array according to an illustrative embodiment of the technology.

FIG. 4 shows a rectenna array 400. The rectenna array 400 includes a group of rectennas 404 as described in FIG. 3A, global MPPT circuitry 412, a low pass filter 416, and a DC to DC converter 420. The group of rectennas 404 is electrically connected to the electrical ground 408 and to global MPPT circuitry 412. The global MPPT circuitry 412 is electrically connected to each of the rectennas 404 and to a low pass filter 416. The low pass filter 416 is electrically connected to the global MPPT circuitry 412 and to a DC to DC converter 412. The DC to DC converter 420 is electrically connected to the low pass filter 416 and to a load device. During operation, each of the rectennas 404 receives AC electrical signals and converts the received AC electrical signals into a DC signal. The DC signal is then transmitted to the global MPPT circuitry 412. The global MPPT circuitry 412 is configured to maximize the power throughput from the output of the rectennas 404 to the load by dynamically adjusting its perceived input impedance, and, thus, achieving an optimum impedance match between the rectenna array output and the load. The MPPT circuit can be a switching power converter that is capable of modulating its input impedance by altering its switching duty cycle. The MPPT circuitry can monitor its input power via a sense resistor, and can adjust its duty cycle in order to maximize this input power.

Figure 5:
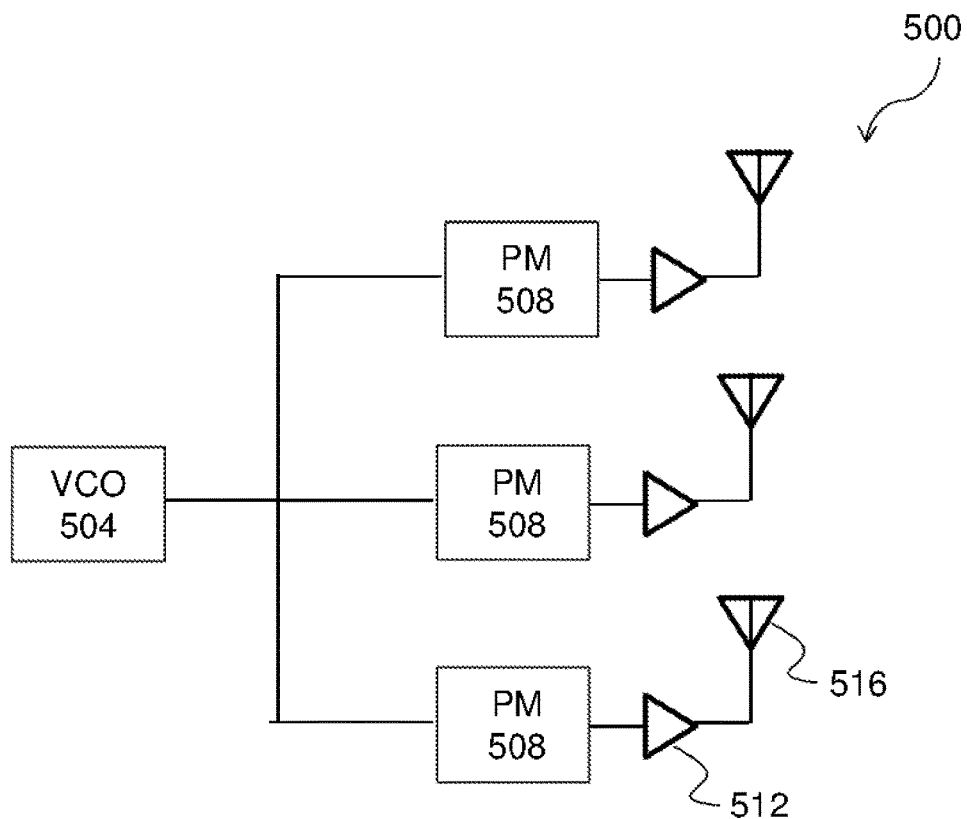
FIG. 5 shows a wireless power transmission system according to an illustrative embodiment of the technology.

FIG. 5 shows a wireless power transmission system 500. The wireless power transmission system 500 includes a voltage controlled oscillator (VCO) 504, a group of phase modulators 508, a group of amplifiers 512, and a group of antennas 516. The VCO 504 is electrically connected to each of the phase modulators 508. Each of the phase modulators 508 is electrically connected to the VCO 504 and to the input of an amplifier 512. Each of the amplifiers 512 is electrically connected to one of the phase modulators 508 and one of the antennas 516. Each of the antennas 516 is electrically connected to one of the amplifiers 512. During operation, the VCO 504 produces a waveform that is delivered to each of the phase modulators 508. Each phase modulator 508 modulates the phase of the received waveform. The phase modulated waveform is then amplified by an amplifier 512 and delivered to an antenna 516. Each of the antennas then radiate the phase modulated and amplified waveform to produce a shaped output beam.

Figure 6:
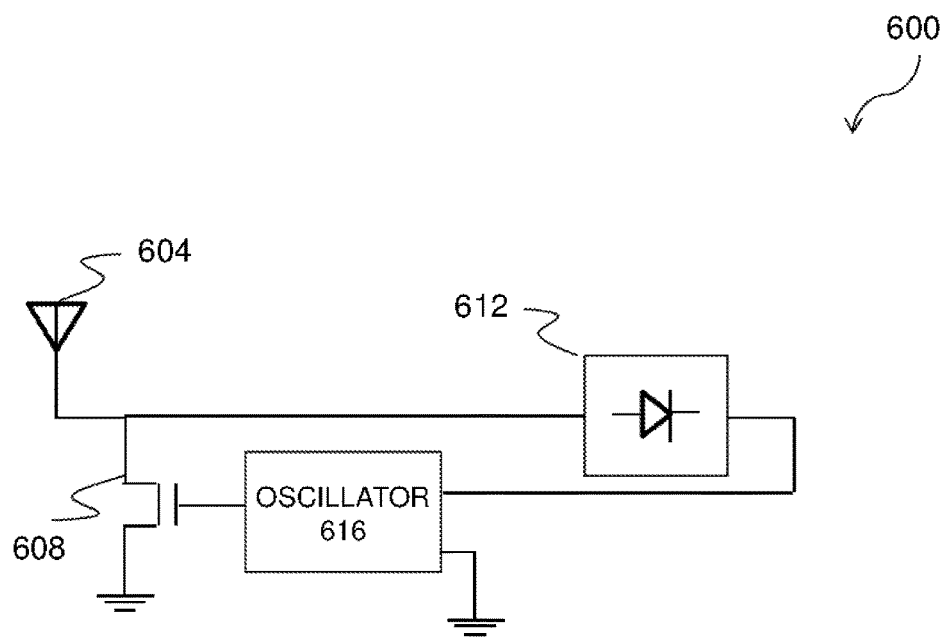
FIG. 6 shows a backscatter localizer according to an illustrative embodiment of the technology.

FIG. 6 shows a backscatter localizer 600. The backscatter localizer 600 includes a receiving antenna 604, a high frequency rectifier 612, an electric switch 608, and an oscillator 616. The receiving antenna 604 is shorted by the electric switch 608. The electric switch 608 is driven by the oscillator 616. In some embodiments, the oscillator 616 oscillates at approximately 100 MHz. The oscillator 616 is powered by the output of the high frequency rectifier 612.

Figure 7:
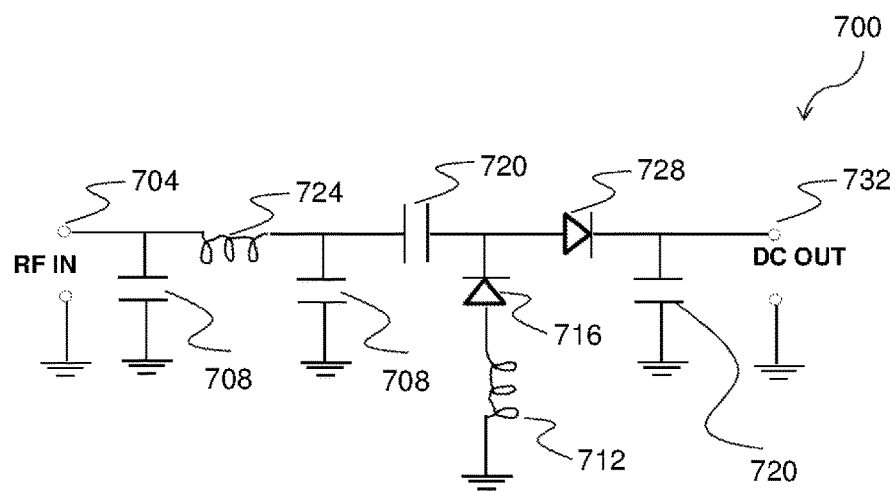
FIG. 7 shows a high frequency rectifier according to an illustrative embodiment of the technology.

FIG. 7 shows a high frequency resonant rectifier 700. The high frequency rectifier includes input 704, inductors 712 and 724, capacitors 708 and 720, diodes 716 and 728, and output 732. The values of the inductors and capacitors can be selected to cause the high frequency resonant rectifier 700 to resonate and to provide an impedance match. In some embodiments, capacitors 708 can be approximately 0.25 pF, capacitors 720 can be approximately 1000 pF, inductor 712 can be approximately 6 nH, inductor 724 can be approximately 1.5 nH, and diodes 716 and 728 can be Schottky diodes such as HSMS286X, produced by Avago Technologies.

Figure 8:
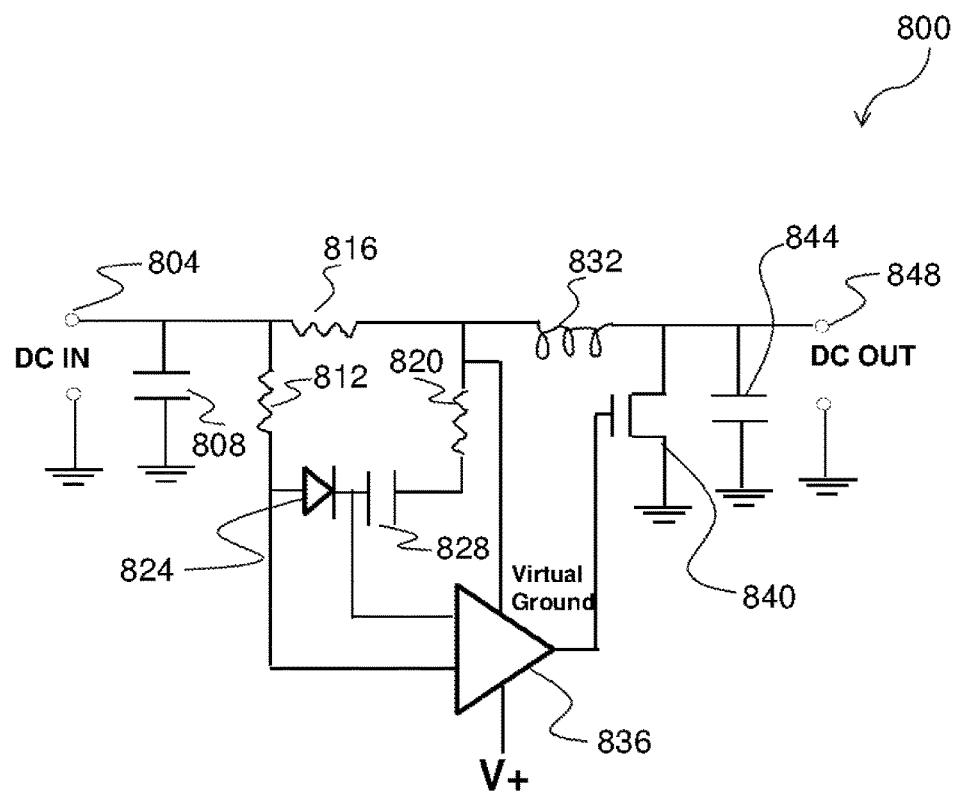
FIG. 8 shows MPPT circuitry according to an illustrative embodiment of the technology.

FIG. 8 shows an MPPT 800. The MPPT 800 includes an input 804, a capacitors 808, 828, and 844, resistors 812, 816, and 820, a diode 824, a comparator 836, a switch/transistor 840, and an output 848.

Figure 9:
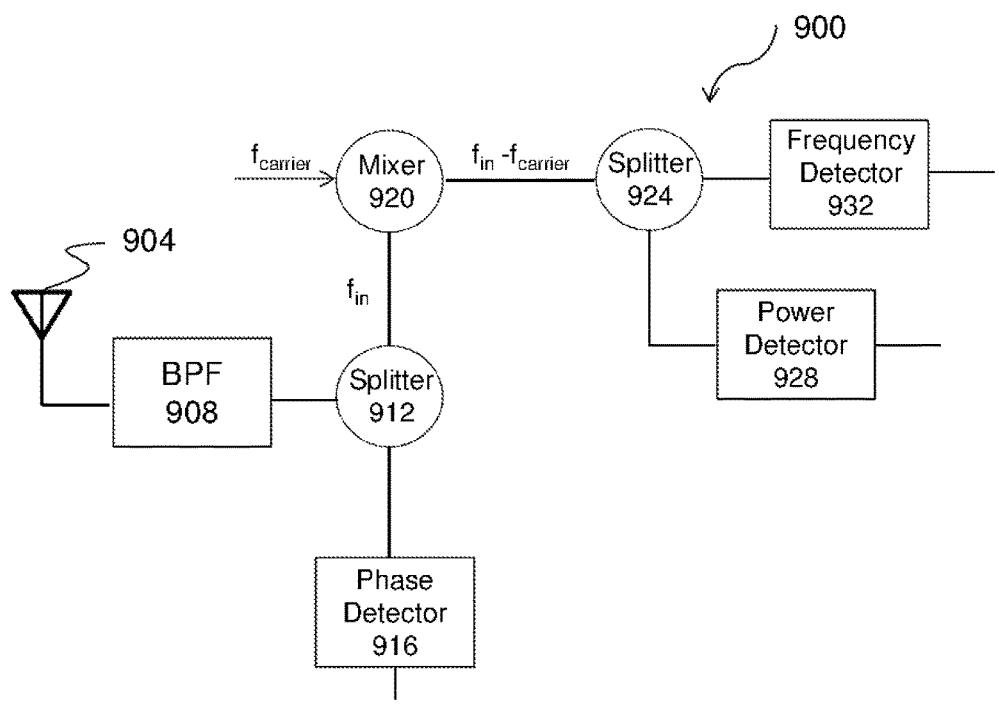
FIG. 9 shows a transmitter side backscatter localizer according to an illustrative embodiment of the technology.

FIG. 9 shows a transmitter side backscatter localizer 900. The transmitter side backscatter localizer 900 includes an antenna 904, a bandpass filter 908, a power splitter 912, a phase detector 916, a mixer 920, a power splitter 924, a frequency detector 932, and a power detector 928. During operation, the antenna 904 receives a backscattered wave and the backscatter localizer 900 analyzes the signal in order to determine the path loss and phase shift associated with the ray path from the transmitter to the receiver generated by the beam transmission at a particular azimuthal and elevation solid angle. The frequency detector can detect a frequency of the backscattered wave and a device identification can be determined based thereon. The phase detector can be a stock chip based on a fast XOR gate. The phase detector can receive an incoming wave and compare it to a reference wave. Based on the comparison, the phase detector can determine the phase difference between the incoming wave and the reference wave. The power detector can be a stock chip based on an RF to RMS DC converter. The power detector can receive an incoming wave and then calculate the RMS value of the incoming wave and transmit a DC voltage out that represents the calculated RMS value. One way of power detecting is by rectifying a wave and observing the DC power.

FIG. 10 shows a method of operation of a wireless power transmission system according to an illustrative embodiment of the technology. A transmitter such as wireless power transmission system 500 generates a narrow beam of radio-frequency energy at an azimuthal and elevation solid angle. The narrow beam is generated via "beamforming." Each antenna (or subarray of antennas) present in the transmitting system can offset in phase from its neighboring element by the same constant shift. For example, if the phase shift between antenna A and antenna B is five degrees, the phase shift between antenna B and antenna C is also five degrees, etc. The narrow beam travels through the environment via some path, potentially involving one or many reflections. The transmitted radio-frequency energy is incident on a rectifying receiver, such as rectenna array 400. If the energy level is above a critical threshold, a backscattering antenna on the rectifying receiver modulates the incident wave and reradiates the wave through the same path back to the transmitter. A sensing antenna on the transmitter receives the backscattered wave and analyzes the signal in order to determine the path loss and phase shift associated with the ray path from the transmitter to the receiver generated by the beam transmission at the particular azimuthal and elevation solid angle. The determined path loss and phase shift are mapped to a transmission solid angle in a hash table on the transmitter's local memory; this is done for every path from the transmitter to the receiver. In some embodiments, the determined path loss and phase shift are mapped to a transmission solid angle and stored in a database on the transmitter's local memory. After all paths are characterized, the most efficient path (the path with the lowest path loss) is identified. A microprocessor then generates the set of all reasonably efficient paths that would constructively interfere with the most efficient path at the receiver antenna array. This set contains all transmission solid angles that result in paths with a path loss that is above 4 dB down from the most efficient path and a phase shift relative to the most efficient path that is within a predetermined margin, typically 10 degrees. This set is referred to as the set of supporting paths. After the set of supporting paths has been determined, the transmitter directs energy along the most efficient path and stochastically progresses through transmitting multiple beams along permutations of the set of supporting paths. Simultaneously, the efficiencies of the multiple-beam transmissions are recorded. After a predetermined number of stochastic progressions through permutations of the set of supporting paths, the transmitter identifies the most efficient (possibly, although not necessarily) multiple-beam transmission. The transmitter then uses the antenna phase modulation to generate this radio-frequency energy vector pattern in order to send power to the receiver in the most efficient manner, given the geometry of the environment. If the transmission efficiency drops by a set value (typical value is 5%) these steps are repeated locally (i.e. local sweeps) to adapt the transmission vectors and allow for receiver mobility.

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method of wirelessly delivering power via a phased antenna array, the method comprising:
   transmitting with a transmission system, a narrow beam of radio-frequency energy having a solid angle, an elevation angle, and an azimuthal angle;
   receiving the narrow beam of radio-frequency energy with a power receiver and if the received radio-frequency energy is above a predetermined threshold, backscattering a portion of the received radio-frequency energy back towards the phased antenna array;
   receiving the backscattered portion and determining a path loss and a phase shift associated therewith;
   associating the determined path loss and phase shift with the elevation angle and azimuthal angle and storing the association in a hash table;
   identifying a most efficient transmission path based on the associations stored in the hash table;
   determining a set of supporting paths that constructively interfere with the most efficient path such that the supporting paths are within 10 degrees of the most efficient path and have less than 4 dB of loss relative to the most efficient path;
   directing energy along the most efficient transmission path and stochastically transmitting energy along the set of supporting paths and recording the transmission efficiencies thereof;
   identifying the most efficient set of supporting paths; and
   phase modulating the phased antenna array to transmit energy along the most efficient transmission path and the most efficient set of supporting paths.

2. The method of claim 1, wherein the transmission system comprises a radio-frequency power transmitter comprising:
   an array of patch antennas, wherein the phased antenna array comprises the array of patch antennas;
   an array of phase modulators, each phase modulator having an input port and associated with one or more of the patch antennas;
   a local oscillator that provides an oscillatory signal to the input port of each of the phase modulators;
   an array of amplifiers, each amplifier receiving an input from one of the phase modulators;
   a microprocessor configured to interface with the array of phase modulators and control a holistic radiative power transmission vector pattern generated by the radio-frequency power transmitter.

3. The method of claim 2 wherein the array of patch antennas is a square array.

4. The method of claim 2 wherein each antenna of the array of patch antennas is resonant at 5.6 GHz.

5. The method of claim 2 wherein portions of the array of patch antennas are controlled together as a subarray.

6. The method of claim 2 wherein the oscillatory signals at the inputs to the phase modulators are in phase.

7. The method of claim 1, wherein the power receiver is a radio-frequency power receiver comprising:
   an array of passively phased, resonant antennas;
   an array of resonant high frequency rectifiers configured to receive energy from the array of antennas;

local and global maximum power point tracking circuitry that is configured to dynamically match a load impedance;

a backscattering antenna configured to aid in receiver localization and receiver incident electric field phase measurements;

a DC-DC converter configured to deliver a fixed voltage determined by a load device.

8. The method of claim 7 wherein the resonant antennas of the power receiver include at least one of a monopole chip antenna, a dipole chip antenna, a printed dipole antenna, and a patch antenna.

9. The method of claim 7 wherein the antennas of the power receiver operate in the 5 GHz-band.

10. The method of claim 7 wherein at least a first portion of the antennas of the power receiver are oriented in a horizontal plane and at least a second portion of the antennas of the power receiver are oriented in a vertical plane.

11. The method of claim 1 wherein each antenna in the transmitting system is offset in phase from neighboring antennas.

12. The method of claim 1 wherein the beam is transmitted along a path involving at least one reflection.

13. The method of claim 1, further comprising, before transmitting the narrow beam:

receiving a request for wireless power from the power receiver;

verifying that the power receiver is authorized to receive power from the transmission system;

tracking the power receiver to determine one or more paths to the power receiver; and selecting at least one antenna from the phased antenna array, the selection being based on the determined one or more paths to the power receiver;

wherein the narrow beam is delivered from the at least one antenna.

14. The method of claim 1, further comprising, before transmitting the narrow beam:

requesting wireless power for the power receiver;

receiving of the request by a cloud server associated with a transmitter in geographic proximity to the power receiver;

adjusting the price of wireless power based on information received from the power receiver and the number of devices requesting wireless power; and transmitting the adjusted price to the power receiver;

wherein transmitting the narrow beam is performed upon confirmation of the adjusted price by a user of the power receiver.

15. The method of claim 14 wherein the information received from the power receiver includes power receiver battery level, power receiver battery consumption rate, user power preferences, user price preferences, or power receiver distance from the transmission system.

* * * * *